United States Patent
Mayer et al.

(10) Patent No.: US 6,905,180 B2
(45) Date of Patent: Jun. 14, 2005

(54) METHOD AND DEVICE FOR MONITORING THE EFFECTIVENESS OF VEHICLE BRAKING SYSTEMS

(75) Inventors: Reinhold Mayer, Kansfeld (DE); Ralf Schmid, Vaterstetten (DE)

(73) Assignee: Knorr-Bremse Systeme für Schienenfahrzeuge GmbH, Munich (DE)

( * ) Notice: Subject to any disclaimer, the term of this patent is extended or adjusted under 35 U.S.C. 154(b) by 0 days.

(21) Appl. No.: 10/296,914
(22) PCT Filed: May 30, 2001
(86) PCT No.: PCT/EP01/06138
§ 371 (c)(1), (2), (4) Date: Mar. 10, 2003
(87) PCT Pub. No.: WO01/92076
PCT Pub. Date: Dec. 6, 2001

(65) Prior Publication Data
US 2004/0036351 A1 Feb. 26, 2004

(30) Foreign Application Priority Data
May 30, 2000 (DE) .......... 100 26 687

(51) Int. Cl.$^7$ .......... B60T 8/34
(52) U.S. Cl. .......... 303/128; 303/176
(58) Field of Search .......... 303/9, 122, 122.09, 303/122.15, 128, 132, 176, 177, 183

(56) References Cited

U.S. PATENT DOCUMENTS 5,645,328 A * 7/1997 Johnson et al. .......... 303/176

FOREIGN PATENT DOCUMENTS

| DE | 38 27 363 | 7/1989 |
| DE | 195 10 755 | 10/1996 |
| DE | 198 48 994 | 5/2000 |

* cited by examiner

Primary Examiner—Thomas Williams
(74) Attorney, Agent, or Firm—Barnes & Thornburg

(57) ABSTRACT

The present invention relates to a method and to a system for monitoring the effectiveness of rail vehicle braking systems and, in response to certain criteria, initiating one or more of a safety braking and a switching-off of a brake-force-limiting or brake-force-reducing device of the braking system when a defined desired slip is not reached.

10 Claims, 1 Drawing Sheet

METHOD AND DEVICE FOR MONITORING THE EFFECTIVENESS OF VEHICLE BRAKING SYSTEMS

BACKGROUND AND SUMMARY OF THE INVENTION

The present invention relates to a method and to a system for monitoring the effectiveness of braking systems of vehicles, particularly rail vehicles.

Braking control systems have the purpose of converting a braking request defined by the driver into a vehicle deceleration. The monitoring of whether the desired vehicle deceleration results from the braking request is normally left to the driver. In the case of rail vehicles, the train engineer, in particular, has the task of recognizing danger situations, such as a faulty response of the braking system or a failure of the braking system and then initiating a safety braking. For avoiding accidents, it is mainly required that disturbances be recognized in time and an emergency braking takes place immediately.

Therefore, the present invention provides a method and a system for monitoring the effectiveness of vehicle braking systems.

The present invention is based on comparing a driver's braking request with the occurring vehicle reaction and of detecting possibly occurring disturbances by a sequential examination of several response criteria and of initiating an emergency or safety braking.

When a braking request of the braking system is not converted into the requested vehicle deceleration, the monitoring device automatically initiates an emergency braking. In this case, existing operating or environmental conditions of the vehicle, such as, for example, the slope of the route, the coefficient of adhesion between the wheel and the rail, are taken into account, so that the vehicle deceleration requested by the driver or the vehicle decelerations maximally possible as a result of the physical marginal conditions are achieved.

An "automatic braking intervention" can take place by way of "signal paths" which, in the case of conventional rail vehicles are to be activated by the driver. Additional intervention possibilities are possible, such as, for example, by switching off braking-force-limiting or braking-force-reducing systems. In other words, instead of an emergency impact button which is normally provided in rail vehicles and is to be operated by the driver, the present invention may have an "intelligent impact button" which is automatically triggered in an emergency and, if desired, an anti-skid protection system may be switched off.

The present invention therefore permits a fast initiation of safety brakings in the event of recognizable disturbances in the braking system. This relieves the driver and significantly increases safety. It is also possible that faulty partial systems of the braking system, for example, the anti-skid protection system, can be switched off automatically. The actually available braking force can therefore be optimally utilized; that is, it can be prevented that the driver erroneously decelerates the vehicle by a lower braking force level than the physically transmissible braking force level.

Other aspects and novel features of the present invention will become apparent from the following detail description of the invention when considered in conjunction with the accompanying drawings.

DETAILED DESCRIPTION OF THE PREFERRED EMBODIMENTS

Figure 1:
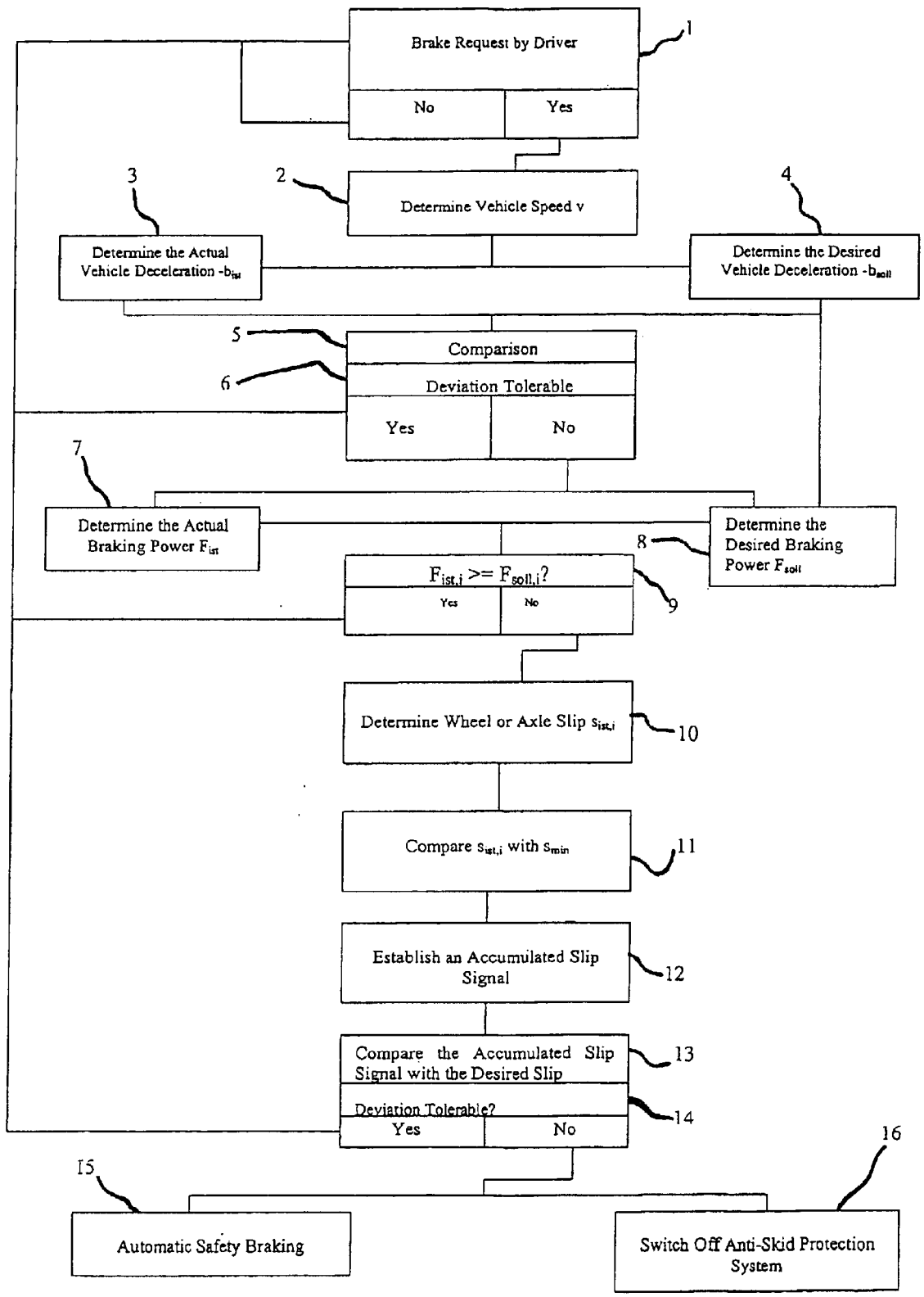
FIG. 1 is a schematic of the process steps, according to the present invention.

In the present inventive process or method for monitoring the effectiveness of braking systems for rail vehicles, the following quantities are used as input quantities:

v: speed of the vehicle above ground $-b_{desired}$: the desired deceleration of the vehicle corresponding to the driver's braking request $v_i$: wheel speeds $F_i$: braking power or forces at wheels or axles.

When a disturbance or undesirable reaction to a braking request in the braking (not shown) system is detected, the following output signals can be generated:

ASB: A signal for the automatic initiation of a safety braking and/or

BFLR: a signal for switching off a braking force limiting or brake-force-reducing device, which can be, for example, an anti-skid protection system.

In method Step 1 of FIG. 1, it is determined whether a driver's braking request is present, Step 1 being constantly repeated when no braking request is present. If a braking request is present, the vehicle speed v is determined in Step 2 by at least one sensor, specifically independently of the operation of the braking system. In this case, the determination of the vehicle speed v takes place by a separate measuring device which is provided specifically for monitoring the effectiveness of the braking system. This can take place, for example, by a radar speed measuring system or by the separate sensing of the speed of an unbraked axle. The vehicle speed, $v_1$ can also be determined in a known manner by analyzing rotational wheel speed signals $v_1$. Here, an analyzing algorithm is to be used which operates independently of the algorithm for determining a reference speed for normal service brakings by a brake control system.

In Step 3, the actual vehicle deceleration, $-b_{actual}$, or $-b_{ist}$, is computed in a known manner from the vehicle speed v. In Step 4, a desired vehicle deceleration $-b_{desired}$, or $-b_{soll}$, is determined from the braking request defined by the driver.

In Step 5, the desired deceleration $-b_{desired}$ and the actual deceleration $-b_{actual}$ are compared with one another; and, in Step 6, it is decided whether the deviation between the desired value, $-b_{soll}$ and the actual value $-b_{ist}$, exceeds a defined tolerance value or can be tolerated. In the comparison between the desired deceleration $-b_{desired}$ and the actual deceleration $-b_{actual}$, environmental parameters, such as, for example, the gradient or slope of the driving route, are taken into account. In this case, it is checked, for example, whether the following relationship has been met:

$$|-b_{actual}| \geq |-b_{desired}| - g*\tan\alpha,$$

g being the location factor of the acceleration due to gravity; and $\alpha$ being the angle of slope or inclination of the driving route. If the deviation between the actual vehicle deceleration $-b_{actual}$ and the desired vehicle deceleration $-b_{desired}$ is considered to be tolerable, a return takes place to Step 1. Otherwise, braking forces $F_{actual,i}$ at individual wheels or axles are determined in Step 7 by at least one sensor. During the braking force monitoring, it is checked whether the braking forces at the individual wheels or axles correspond to the values which are required for reaching the requested vehicle deceleration $-b_{desired}$. The braking forces $F_{desired}$ necessary for reaching the requested vehicle deceleration are determined in Step 8 as a function of the requested vehicle deceleration $-b_{desired}$ determined in Step 4, that is $F_{desired}=f(-b_{desired})$.

In Step 9, it is checked whether the actual braking forces are greater than the desired braking forces, that is, whether the following applies:

$$F_{actual,i} \geq F[(-b_{desired})]_{desired,i}.$$

The braking forces at the individual wheels or axles can be determined by measuring, for example, brake pressure, or can be estimated on the basis of the brake cylinder pressures or other known quantities of the braking system. If the braking force is sufficient, a return takes place to Step 1. However, if the braking force is too low or lower than the desired braking force $F_{desired,i}$ a slip monitoring is carried out. For this purpose, in Step 10, first the wheel slip $s_{actual,i}$ at individual wheels or axles is determined according to the following formula:

$$s_{actual,i} = 1 - \frac{vi}{v}$$

If necessary, when determining the actual slip $s_{actual,i}$, peculiarities of the basic braking system are taken into account. Thus, for example, in the case of an anti-skid control per bogie or rail vehicle truck, it may be sufficient for an axle in the bogie to reach a defined minimal slip.

In Step 11, actual slip signals, or values $s_{is}$, are compared with the defined minimal slip $s_{min}$; that is, it is checked whether $$1 - \frac{vi}{v} > s_{min}.$$

For each wheel or each axle, the checking is linked with a time criterion. In Step 12, the results for the individual wheels or axles are combined to a sum statement, that is, to a summation slip signal or value. In Step 13, the summation slip signal is compared with a defined desired slip. If the desired slip has been reached, a return takes place in Step 14 back to Step 1. If, however, a deviation exists which cannot be tolerated, a signal is generated that initiates, in Step 15, an automatic safety braking and/or the signal initiates a complete or partial switching off of one of a braking-force-limiting and brake-force-reducing device, in Step 16. The braking-force-limiting or brake force reducing device may be an anti-skid protection system.

Although the present invention has been described and illustrated in detail, it is to be clearly understood that this is done by way of illustration and example only and is not to be taken by way of limitation. The spirit and scope of the present invention are to be limited only by the terms of the appended claims.

We claim:

1. A Method for monitoring the effectiveness of braking systems of rail vehicles, the steps comprising:

determining whether a driver's brake request is present;

determining vehicle speed;

determining actual deceleration of the vehicle from the vehicle speed;

comparing the actual deceleration with a desired deceleration;

determining actual braking forces at one or both of individual wheels and axles;

comparing the actual braking forces with desired braking forces which are required for reaching the desired deceleration when a deviation between the desired deceleration and the actual deceleration exceeds a defined tolerance value;

determining actual slip values at one or more of individual wheels and axles comparing the actual slip values with a defined minimal slip when the actual braking forces are lower than the desired braking forces;

summing the actual slip values of one or more of individual wheels and axles to a summation slip signal;

initiating one or more of a safety braking and switching-off of a braking-force-limiting of brake-force-reducing device of the braking system when a defined desired slip is not reached.

2. The method according to claim 1, wherein the vehicle speed is determined by a separate measuring device which is independent of a speed measuring device provided for control or regulating of normal service brakings.

3. The method according to claim 1, wherein the vehicle speed is determined by a radar measuring system.

4. The method according to claim 1, wherein the vehicle speed is determined by measuring the speed of one or more of an unbraked wheel and an unbraked axle.

5. The method according to claim 1, wherein during the comparison of the actual deceleration with the defined desired deceleration, the slope of the vehicle's driving route is taken into account.

6. The method according to claim 1, wherein during the comparison of the actual wheel slip values with the minimal slip, a time criterion is taken into account.

7. The method according to claim 1, wherein the switching off of one of a braking-force-limiting and brake-force reducing device includes one or more of completely and partially switching off of an anti-skid protection system of the vehicle.

8. The method according to claim 1, further including measuring the actual braking forces.

9. The method according to claim 1, estimating the actual braking forces based upon brake cylinder pressures.

10. A system for monitoring the effectiveness of braking systems of rail vehicles, comprising:

at least one sensor for sensing a driver's braking request;

at least one sensor for sensing the rail vehicle's speed;

at least one sensor for determining actual braking forces at one of individual wheels and axes; and determining actual deceleration of the vehicle from the vehicle speed, comparing the actual deceleration with a desired deceleration requested by the driver, comparing the actual braking forces with desired braking forces required for achieving the desired deceleration when a deviation between the desired deceleration and the actual deceleration exceeds a defined tolerance level, determining actual slip values at one or more of individual wheels and axes from wheel speeds and the vehicle speed, comparing the actual slip values with a defined minimal slip when the actual braking forces are lower than desired braking forces, summing the actual slip values and generating a summation slip signal, and generating a signal for initiating one of a safety braking and a switching off of one of a braking-force-limiting and brake-force-reduction device of the braking system when the defined minimal slip is not reached.

* * * * *